United States Patent
Gross et al.

(10) Patent No.: US 9,117,093 B2
(45) Date of Patent: Aug. 25, 2015

(54) CENTRALIZED, POLICY-DRIVEN MAINTENANCE OF STORAGE FOR VIRTUAL MACHINE DISKS (VMDKS) AND/OR PHYSICAL DISKS

(71) Applicant: CA, Inc., Islandia, NY (US)

(72) Inventors: Miron Gross, Kfar Haoranim (IL); Eitan Hadar, Nesher (IL); Nir Barak, Karmi Yosef (IL)

(73) Assignee: CA, Inc., New York, NY (US)

( * ) Notice: Subject to any disclaimer, the term of this patent is extended or adjusted under 35 U.S.C. 154(b) by 517 days.

(21) Appl. No.: 13/627,505

(22) Filed: Sep. 26, 2012

(65) Prior Publication Data

US 2014/0089916 A1      Mar. 27, 2014

(51) Int. Cl.
*G06F 9/455* (2006.01)
*G06F 21/78* (2013.01)
*G06F 11/07* (2006.01)
*G06F 21/80* (2013.01)

(52) U.S. Cl.
CPC ............ *G06F 21/78* (2013.01); *G06F 9/45558* (2013.01); *G06F 11/0712* (2013.01); *G06F 11/0727* (2013.01); *G06F 11/0793* (2013.01); *G06F 21/80* (2013.01); *G06F 2009/45591* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 8,156,301 B1 * | 4/2012 | Khandelwal et al. | 711/170 |
| 8,291,180 B2 * | 10/2012 | Austruy et al. | 711/162 |
| 8,352,939 B1 * | 1/2013 | Edwards et al. | 718/1 |
| 8,499,114 B1 * | 7/2013 | Vincent | 711/6 |
| 8,539,137 B1 * | 9/2013 | Protassov et al. | 711/6 |
| 8,572,138 B2 * | 10/2013 | Sundar et al. | 707/828 |
| 8,838,542 B1 * | 9/2014 | Chester et al. | 707/640 |
| 8,904,081 B1 * | 12/2014 | Kulkarni | 711/6 |
| 2008/0184241 A1 * | 7/2008 | Headrick et al. | 718/102 |
| 2008/0263658 A1 * | 10/2008 | Michael et al. | 726/22 |
| 2009/0007105 A1 * | 1/2009 | Fries et al. | 718/1 |
| 2009/0216975 A1 * | 8/2009 | Halperin et al. | 711/162 |
| 2011/0138442 A1 * | 6/2011 | Vinberg et al. | 726/1 |
| 2011/0154320 A1 * | 6/2011 | Verma | 718/1 |
| 2011/0154329 A1 * | 6/2011 | Arcese et al. | 718/1 |
| 2011/0265183 A1 * | 10/2011 | Wu et al. | 726/24 |
| 2012/0110281 A1 * | 5/2012 | Green et al. | 711/154 |
| 2012/0110574 A1 * | 5/2012 | Kumar | 718/1 |

(Continued)

OTHER PUBLICATIONS

CN 102419803 A (English translation of Chinese patent application); Computer virus killing method, system and apparatus, Nov. 1, 2011; (CN102419803A-English.pdf; pp. 1-8).*

(Continued)

*Primary Examiner* — Emerson Puente
*Assistant Examiner* — Hiren Patel
(74) *Attorney, Agent, or Firm* — Myers Bigel Sibley & Sajovec, P.A.

(57) ABSTRACT

In a method of operating a computing system, a disk image corresponding to a production managed machine is mounted on a service managed machine that performs operations distinct from those performed by the production managed machine in providing a computing service. The disk image is scanned at the service managed machine to determine a corrective action to be performed with respect to the disk image, and performance of the corrective action for the disk image of the production managed machine is initiated at the service managed machine. Related systems and computer program products are also discussed.

27 Claims, 7 Drawing Sheets

(56) References Cited

U.S. PATENT DOCUMENTS

| | | | |
|---|---|---|---|
| 2012/0167080 A1* | 6/2012 | Vilayannur et al. | 718/1 |
| 2012/0278799 A1* | 11/2012 | Starks et al. | 718/1 |
| 2013/0036418 A1* | 2/2013 | Yadappanavar et al. | 718/1 |
| 2013/0104125 A1* | 4/2013 | Sarma et al. | 718/1 |
| 2013/0132942 A1* | 5/2013 | Wang | 717/176 |
| 2014/0053226 A1* | 2/2014 | Fadida et al. | 726/1 |
| 2014/0096134 A1* | 4/2014 | Barak et al. | 718/1 |
| 2014/0325514 A1* | 10/2014 | Benedetti et al. | 718/1 |

OTHER PUBLICATIONS

European Patent application No. EP11193047; IBM; "Maintenance of offline virtual machines based on a maintenance register", Dec. 12, 2011; (EP11193047_IBM.pdf; pp. 1-30).*

VMware; "VMware Disk Mount Users Guide" item: EN-000055-01, copyright 2008; (VMware_2008.pdf; pp. 1-12).*

VMware, Inc., "VMware Disk Mount User's Guide: Virtual Disk Development Kit", http://www.vmware.com., Issue Date: 2008, pp. 1-12.

* cited by examiner

CENTRALIZED, POLICY-DRIVEN MAINTENANCE OF STORAGE FOR VIRTUAL MACHINE DISKS (VMDKS) AND/OR PHYSICAL DISKS

BACKGROUND

The present disclosure relates to computing systems, and in particular to maintenance of computing systems, such as in virtualized computer environments.

Virtualized computing environments, also referred to as cloud computing systems or composite information technology systems, are used to provide computing resources to end users. In a cloud computing environment, the physical hardware configuration is hidden from the end user. Cloud computing systems may include servers, network storage devices, routers, gateways, communication links, software (e.g., applications, operating systems, web services, etc.), and other devices. However, because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines or appliances, which are guest operating systems installed within a host system and an optional preset configuration and structure (e.g., combination of operating system and web server). A virtual machine (VM) can be a software implementation of a machine or computer that executes programs as would a physical machine, in a manner that is transparent to a user. Virtual machines are typically implemented with software emulation and/or hardware virtualization. A single hardware and/or software platform may host a number of virtual machines, each of which may have access to some portion of the platform's resources, such as processing resources, storage resources, etc.

Many maintenance tasks on virtual machine disks (VMDKs) can be executed while the virtual machine (VM) is online, using for example the hardware resources associated with or used by the VM. These maintenance tasks can include (but are not limited to) defragmenting (either the files into the VMDK or the VMDK file in datacenter), wiping deleted files/cleaning (temporary folders, browsing history, cache, etc.), scanning for malicious software (malware), removing malicious software if found (by anti-virus, etc.), configuration management of operating systems (such as set registry values or configuration files), file integrity monitoring and reports (checksums), backup operations, disk formatting, and others. As such, hardware resources of the VMs' host (including for instance, CPU, memory, disks, and/or network resources) may be consumed in performing these and/or other maintenance tasks.

BRIEF SUMMARY

According to an embodiment described herein, a computer system includes a service managed machine that is configured to perform operations distinct from those performed by a production managed machine in providing a computing service. The service managed machine is configured to mount a disk image corresponding to the production managed machine, scan the disk image to determine a corrective action to be performed with respect to the disk image, and initiate performance of the corrective action for the disk image of the production managed machine. The production managed machine and/or the service managed machine may be physical or virtual machines.

In an embodiment, the service managed machine may be associated with a resource having a lower priority relative to that used by the production managed machine in providing the computing service. The lower priority resource may be a hardware resource that is less expensive or used less frequently (or not at all) by the production managed machine in providing the computing service. In an example, the resource may be a non-production resource that is not configured for use by the production machine in providing the computing service.

In an embodiment, the disk image may be a cloned copy of contents stored on a data storage medium associated with the production machine, and the service machine may be configured to transmit data specifying the corrective action to a service agent installed on the production managed machine. The service agent installed on the production managed machine may be configured to perform the corrective action when the production managed machine is in an online state.

In an embodiment, the corrective action may be a plurality of corrective actions to be performed. The service machine may be configured to generate a queue of the corrective actions based on relative priorities thereof and transmit data specifying the queue of the corrective actions to a service agent installed on the production managed machine. The service agent installed on the production managed machine may be configured to perform the corrective actions in the queue when the production managed machine is in an online state.

In an embodiment, the production and service managed machines may be virtual machines, and the production machine may not include a service agent installed thereon. The service machine may be configured to perform the corrective action for the disk image to provide a maintained disk image for the production machine when the production machine is in a locked, offline, or transient state. Also, the service managed machine may be configured to perform different ones of the corrective actions (and/or alter an order of performance of the corrective actions) depending on the state of the production machine.

In an embodiment, the service machine may be configured to mount the disk image responsive to receiving a command from a maintenance scheduler based on an availability of resources (for example, based on an operating load) of the production system the service machine, or an environment (such as a datacenter) including the production machine and the service machine.

In an embodiment, the production machine may be one of a plurality of production machines. The production machines may include virtual machines, physical machines, or both virtual and physical machines. The maintenance scheduler may be configured to provide the command to the service machine based on a relative priority of the production machine among the plurality of production machines as indicated by a stored maintenance policy. The relative priority may be based on a service level agreement, a relative maintenance need, a time of previously performed maintenance, or a hardware type associated with the production machine.

In an embodiment, the maintenance scheduler may be configured to provide the command to the service managed machine responsive to a state change in the production managed machine.

In an embodiment, the disk image may be a cloned copy of contents stored on a data storage medium associated with the production machine. The disk image may be maintained on hardware that is less expensive than the data storage medium associated with the production machine.

According to a further embodiment described herein, in a method of operating a computing system, a disk image corresponding to a production managed machine is mounted on a service managed machine. The service managed machine is configured to perform operations distinct from those performed by the production managed machine in providing a computing service. The disk image is scanned at the service managed machine to determine a corrective action to be performed with respect to the disk image, and performance of the corrective action for the disk image of the production managed machine is initiated at the service managed machine.

According to a still further embodiment described herein, a server system includes a processor, a host operating system that executes on the processor, a plurality of virtual machines deployed within a virtualization environment, and a virtual hypervisor that provides an interface between the host operating system and the virtual machines. The virtual machines include at least one production virtual machine that is configured to provide a computing service, and at least one service virtual machine that is configured to perform operations distinct from those of the production virtual machine in providing the computing service. The service virtual machine is configured to mount a virtual machine disk image corresponding to the production virtual machine, scan the virtual machine disk image to determine a corrective action to be performed with respect to the virtual machine disk image, and initiate performance of the corrective action for the virtual machine disk image of the production virtual machine.

Other systems, methods, and/or devices according to some embodiments will become apparent to one with skill in the art upon review of the following drawings and detailed description. It is intended that all such additional embodiments, in addition to any and all combinations of the above embodiments, be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
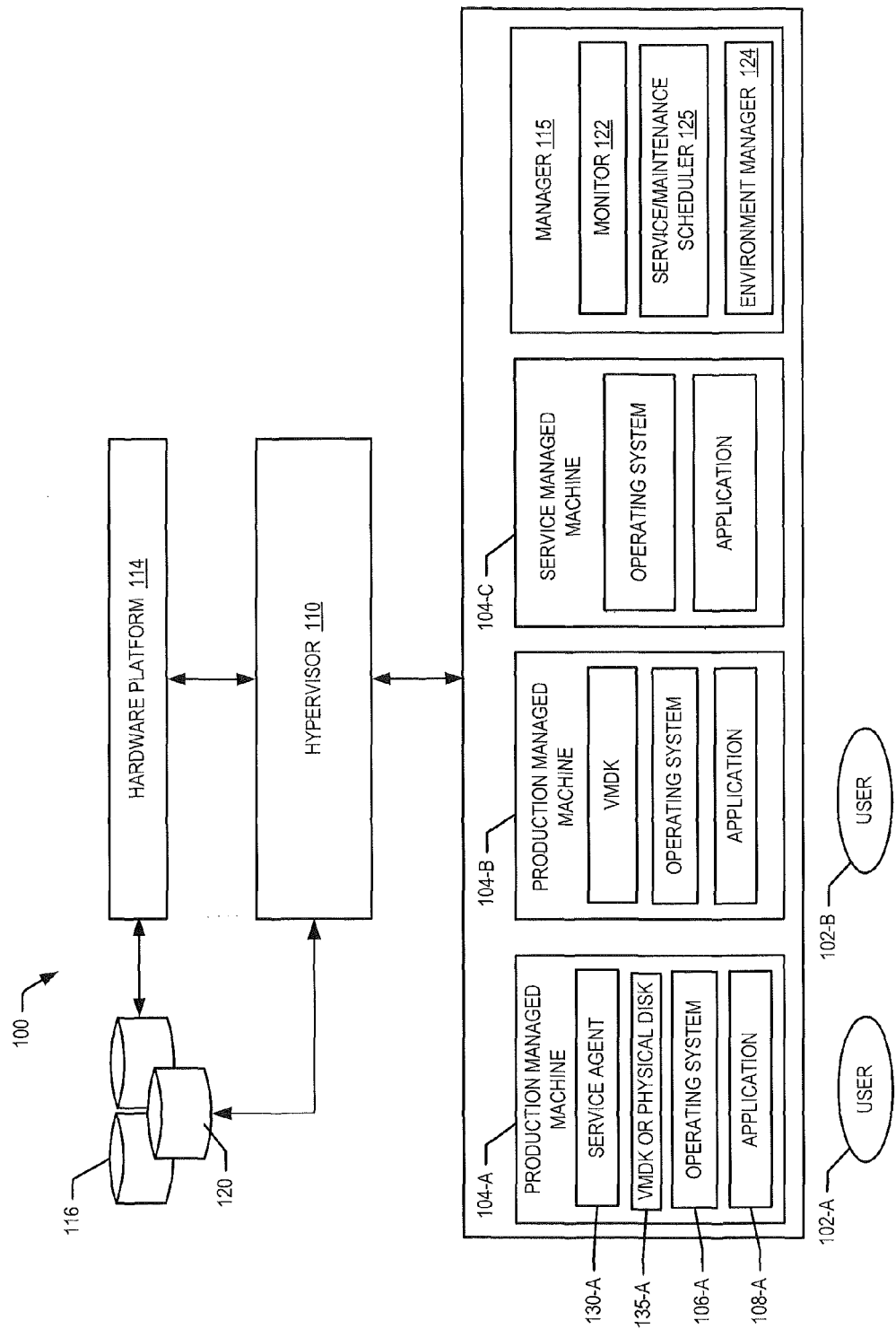
FIG. 1 is a block diagram illustrating a computing system that supports a virtual operating environment in accordance with an embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," "processor," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Unless otherwise defined, all terms (including technical and scientific terms) used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

As described herein, a computing environment may include one or more hosts, operating systems, peripherals, and/or applications. Machines in a same computing environment may have shared memory or resources, may be associated with the same or different hardware platforms, and/or may be located in the same or different physical locations. Computing environments described herein may refer to a virtualized environment and/or a physical environment. Managed machines described herein may refer to physical or virtual machines (VMs). A disk is used generally herein to refer to any data storage medium or device, while a disk image refers to a file or storage device that contains a representation of the contents and structure of the data storage medium or device, such as a complete sector-by-sector copy of the source disk.

As further described herein, a production managed machine refers to a machine (physical or virtual) that is configured to actively perform operations or tasks associated with providing one or more computing services (including processing and/or storage services). In contrast, a service managed machine refers to a machine (physical or virtual) that is dedicated to execution of maintenance tasks or other corrective actions for a production managed machine, and thus performs operations or tasks distinct from those associated with the service(s) provided by the production machine. In other words, the service machine may be considered a "non-production" machine that is dedicated to performance of tasks or operations that are not associated with the computing service provided by the production machine(s). Such tasks or operations are generally referred to herein as corrective actions. The service machine(s) and the production machine(s) are typically located in a same computing environment or datacenter, and/or may share memory or other resources in some embodiments. However, in other embodiments, the service machines may be exclusively associated with non-production resources (e.g., hardware that is not used by the production machine in providing the computing service). In either case, the production machines may be unaware of the operation of the service machines in some embodiments. That is, the operations of the service machines may be transparent to the production machines.

Some embodiments of the disclosure described herein arise from realization that performing corrective actions (including disk maintenance operations for physical disks and/or virtual machine disks (VMDKs)) while a production managed machine is running can affect the production machine's performance, for example, due to consumption of hardware resources (such as I/O, CPU, memory, and/or network), which can thus reduce productivity. The installation and setup of disk maintenance software on each production machine may likewise reduce productivity. Other issues may also arise when maintenance operations are executed on active production machines without considering load and/or business plans of the datacenter as a whole. Furthermore, because maintenance usually is not executed during datacenter load peaks ("rush hours") and/or when higher-priority operations are being executed to prevent degradation in performance, not all maintenance tasks may be executed. The delay or failure in executing these maintenance tasks can, over time, affect the storage quality, performance, and/or capacity of the computing services provided by the managed machine.

Accordingly, some embodiments described herein enable centralized, controlled, policy-driven maintenance (for example, based on service-level agreement (SLA)) during the life cycle of a production machine, including dormant/offline state, transition states (e.g., shut down or start up), and/or online state. Some embodiments described herein further enable such centralized, controlled, policy-driven maintenance while reducing the hardware usage on a production machine when it is online. In particular, many and/or all of the disk maintenance tasks or operations described herein can be tracked and/or executed by a service machine (or pool of service machines) that copies and/or or mounts virtual machine disks (VMDKs) from production virtual machines and scans the VMDK (or the clone thereof). In some instances, the service virtual machine performs any outstanding or required maintenance tasks, and then releases the VMDK. For example, when the production virtual machine is offline or in a transient state (e.g., starting-up or shuttingdown), the maintenance tasks may be executed on the service virtual machine itself. In other instances, the service virtual machine queues or otherwise keeps a list of corrective actions that are to be executed back on the production virtual machine. For example, when the production virtual machine is online and includes an installed service agent, the service virtual machine clones and scans the VMDK, and transmits the queue(s) to the service agent and the maintenance tasks may be executed on the production virtual machine. Accordingly, in embodiments described herein, the production machines (and the system resources associated therewith) can be focused on tasks relating to providing an associated computing service, rather than taking care of disk maintenance, allowing for more production cycles. In other words, some or all disk maintenance tasks can be at least partially offloaded to one or more service machines, which may perform (or at least manage/queue) the maintenance tasks on behalf of the production machine(s).

The implementation of VMDK maintenance operations can be based on the current state of the production VM (online, offline, or transient). In some embodiments, VMDK maintenance can be triggered by state change event in the production VM, such as the transition from online to dormant (or vice versa). The type, amount, and/or frequency of VMDK maintenance can also be determined and/or controlled by one or more stored maintenance policies. Such policies can be based on SLA, timing (e.g., perform maintenance operations during low datacenter utilization, halt maintenance operations during peak loads), and/or other factors. Embodiments of the present disclosure may be applicable to both physical and virtual production machines (for example, when using a service agent installed on the production machines), or may be applicable to virtual production machines only (for example, when no service agent is installed on the production machines). Embodiments described below present several use cases and flows that can conduct activities in operational modes using centralized control services.

FIG. 1 is a block diagram illustrating a computer system 100 for a virtualized computing environment in which the subject matter of the present disclosure can be embodied. Although various embodiments are described in the context of a virtualized computing environment, the invention is not limited thereto and may be used to manage maintenance operations or other corrective actions in non-virtual computer environments as well. The computer system 100 generally hosts and manages one or more managed machines (including production machines 104-A and 104-B and service machine 104-C), each of which may run an operating system 106 and application 108. The computing needs of users 102-A and 102-B (e.g., humans and/or other virtual/non-virtual machines) may drive the functionality of the production managed machines 104-A and 104-B in providing computing services (such as processing and/or data storage services) for the users 102-A and 102-B. The service managed machine 104-C is dedicated to execution of maintenance tasks for the production managed machines 104-A and 104-B, and thus performs operations or tasks distinct from those associated with the service(s) provided by the production managed machines 104-A and 104-B. The service managed machine 104-C may also use resources and/or operate at times that are selected to reduce and/or minimize adverse effects on the operations performed by the production managed machines 104-A and 104-B in providing the computing services.

A hypervisor 110 can provide an interface between the managed machines 104 and a host (such as a host operating system or hardware platform 114) and allow multiple guest operating systems 106 and associated applications 108 to run concurrently. The host handles the operations of a hardware platform 114 capable of implementing the managed machines 104. A data storage space 116 may be accessed by the hypervisor 110 and is connected to the hardware platform 114. The hardware platform 114 generally refers to any computer system capable of implementing managed machines 104, which may include, without limitation, a mainframe computer platform, personal computer, mobile computer (e.g., tablet computer), saver, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing hardware may include circuit (s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of software applications, random access memory (RAM), or read only memory (ROM), removable media, or any other suitable memory component. According to the illustrated embodiments, the hypervisor 110 functionally interconnects the hardware platform 114 and the users 102 and is responsible for the management and coordination of activities and the sharing of the computer resources.

The hypervisor 110 may operate at the highest priority level in the system 100, executing instructions associated with the hardware platform 114, and it may have exclusive privileged access to the hardware platform 114. The priority and privileged access of hardware resources affords the hypervisor 110 exclusive control over resources and instructions, and may preclude interference with the execution of different application programs or the operating system. The hypervisor 110 can create an environment for implementing a virtual machine, thereby hosting the "guest" virtual machines 104. hypervisor 110 is capable of implementing multiple isolated virtual machines simultaneously.

The hypervisor 110 (which may also be a virtual machine monitor/manager or VMM) provides an interface between the managed machines 104 and the hardware platform 114. The hypervisor 110 virtualizes the computer system resources and facilitates the operation of the managed machines 104. The hypervisor 110 may provide the illusion of operating at the highest priority level to the guest operating system 106. However, the hypervisor 110 can map the guest operating system's priority level to a priority level lower than the top most priority level. As a result, the hypervisor 110 can intercept the guest operating system 106, and execute instructions that require virtualization assistance. Alternatively, the hypervisor 110 may emulate or actually execute the instructions on behalf of the guest operating system 106. Software permitting indirect interaction between the guest operating system 106 and the physical hardware platform 114 can also be performed by the virtual hypervisor 110.

When operating in a virtualized environment, the managed machines 104 present a virtualized environment to the guest operating systems 106, which in turn provide an operating environment for applications 108 and other software constructs.

The data storage space 116 of the computer system 100 includes a policy repository 120 that contains policies. Each of the policies stored in the repository 120 can be associated with one or more of the managed machines 104, and can include a plurality of entries that define rules for observable events, actions that are performed responsive to occurrence of the events, and/or the authorized user(s) and/or group(s) who can change policies, initiate actions, and/or participate in actions. The policies stored in the repository 120 may include one or more maintenance policies that specify the type, timing, and/or frequency of corrective actions (such as disk maintenance operations) to be performed in maintaining the disks/data storage media 135 of one or more of the managed machines 104. The maintenance policy or policies stored in the repository 120 may also indicate a maintenance priority of one or more of the managed machines 104. The priority may be based, for example, on one or more terms of a service level agreement (SLA), a relative maintenance need, a time of previously performed maintenance, or a hardware type associated with a particular managed machine 104 relative to one or more other managed machines 104. As described herein, a service-level agreement (SLA) may refer to part of a service contract, typically between a customer and a service provider, that records a common understanding about services, priorities, responsibilities, guarantees, and warranties. The SLA may specify the levels of availability, serviceability, performance, operation, or other attributes of the service. The "level of service" can also be specified as "target" and "minimum," which allows customers to be informed what to expect (the minimum), while providing a measurable (average) target value that shows the level of organization performance.

In accordance with various embodiments, the computer system 100 further includes a manager 115 (such as a virtualization manager) including a system monitor 122, an environment manager 124, and a centralized service or maintenance scheduler 125. The system monitor 122 is configured to monitor the system 100 and determine real-time conditions (including current operating loads) for each of the machines 104 and/or the system 100 as a whole. The environment manager 124 is configured to manage the operations of the managed machines 104. For example, the environment manager 124 may be configured to deploy, provision, activate, and/or suspend operations of virtual machines 104, and/or to move virtual machines 104 from one hypervisor to another or from one virtualization environment to the other. In performing its tasks, the environment manager 124 may typically consider capacity and availability issues of resources for one or more of the machines 104.

The centralized service or maintenance scheduler (also referred to herein as a scheduling module) 125 oversees the performance of maintenance tasks or other corrective actions for the production machines 104-A and 104-B by offloading the tracking and/or performance of these tasks/actions to the service machine 104-C. In particular, in response to a command from the maintenance scheduler 125, the service machine 104-C may determine any outstanding maintenance items or other corrective actions with respect to the production machines 104-A and/or 104-B, and may initiate performance of the determined maintenance items/corrective actions. For example, where the production machine 104-A is online and includes an installed service agent 130-A, the service machine 104-C may queue the maintenance items/corrective actions and may forward the queue to the production machine 104-A for performance by the service agent 130-A installed thereon. However, where the production machine 104-B does not include an installed service agent or is offline, the service machine 104-C may itself mount the VMDK 135-B and perform the determined maintenance items/corrective actions, and may thus provide a maintained virtual machine disk 135-B for the production machine 104-B.

The operations of the service virtual machine 104-C may be managed by the maintenance scheduler 125. In managing the maintenance tasks, the maintenance scheduler 125 may consider stored maintenance policies, SLAs, real-time operating conditions (for example, perform maintenance during low datacenter utilization, halt maintenance in peak loads), hardware type (for example, based on associated cost/expense), and/or other factors for the entire enterprise, as well as for a particular machine 104, environment, or host. The scheduler can thus prioritize maintenance (for example, based on the relative importance of the production VMs 104-A and 104-B, the real-time availability of resources for service VM 104-C, etc.) and/or perform load balancing as needed. The maintenance tasks to be tracked and/or performed by the service VM 104-C can include (but are not limited to): defragmenting (either the files into the VMDK or the VMDK file in datacenter), wiping deleted files/cleaning (temporary folders, browsing history, cache, etc.), scanning for and removing malicious software (malware) if found (by anti-virus, etc.), configuration management of Operating Systems (such as set registry values or configuration files), file integrity monitoring and reports (checksums), backup operations, disk formatting, etc. As discussed in greater detail below, in some embodiments the service VM 104-C may determine and perform the corrective actions/maintenance tasks for the production machines, while in other embodiments the service VM 104-C may determine the corrective actions/maintenance tasks to be performed, and may send a list of the determined tasks/actions to the production machines for performance thereon.

Although illustrated by way of example as separate blocks in FIG. 1, it will be understood that the maintenance scheduler 125 may be integrated or otherwise included in the system monitor 122 or in the environment manager 124 in some embodiments. More generally, while illustrated herein with reference to specific functions performed by specific blocks, it will be understood that the functionality of blocks shown herein may be combined, divided, or eliminated. Also, while illustrated in FIG. 1 with respect to managed virtual machines 104 in a virtual computing environment, it will be understood that embodiments of the present disclosure may be applied to managed machines in physical computing environments and/or cloud computing environments as well.

Figure 2:
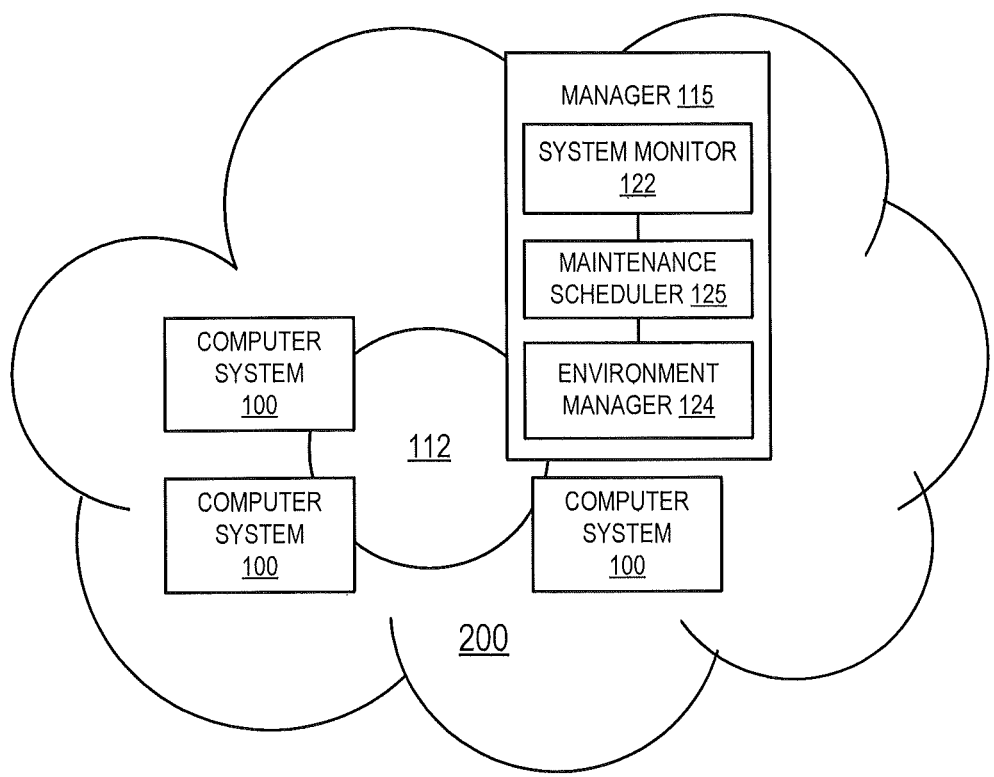
FIG. 2 is a block diagram illustrating a physical layout of a computing environment in accordance with an embodiment of the present disclosure.

FIG. 2 illustrates an example of a physical layout of a computing environment in accordance with embodiments of the present disclosure. Referring now to FIG. 2, a computing environment 200 (referred to generally as cloud 200) may include one or more systems 100 that may include one or more electronic computing devices, such as one or more managed machines that are operable to receive, transmit, process, and store data. For example, the system(s) 100 may include one or more production managed machines in the form of one or more general-purpose personal computers, workstations, server computers, server pools, or any other suitable devices that are configured to perform operations to provide one or more computing services. The system(s) 100 may also include one or more service managed machines that are configured to perform operations relating to maintenance or other corrective actions for the production managed machine(s), which are distinct from the operations performed by the production managed machine(s) in providing the computing service(s). In certain embodiments, the cloud 200 may include a web server. In short, the cloud 200 may include any suitable combination of software, firmware, and hardware.

The cloud 200 may include a plurality of systems 100 that are communicatively coupled via a network 112. The manager 115, including the system monitor 122, environment manager 124, and maintenance scheduler 125, may also be communicatively coupled to the systems 100 via the network 112, and thus, may monitor, manage, and initiate performance of maintenance operations or other corrective actions with respect to one or more of the systems 100. As such, the system monitor 122, environment manager 124, and maintenance scheduler 125 may collectively define a centralized management system 115 for the systems 100. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems," it will be appreciated that any suitable computing device may be used.

Figure 3:
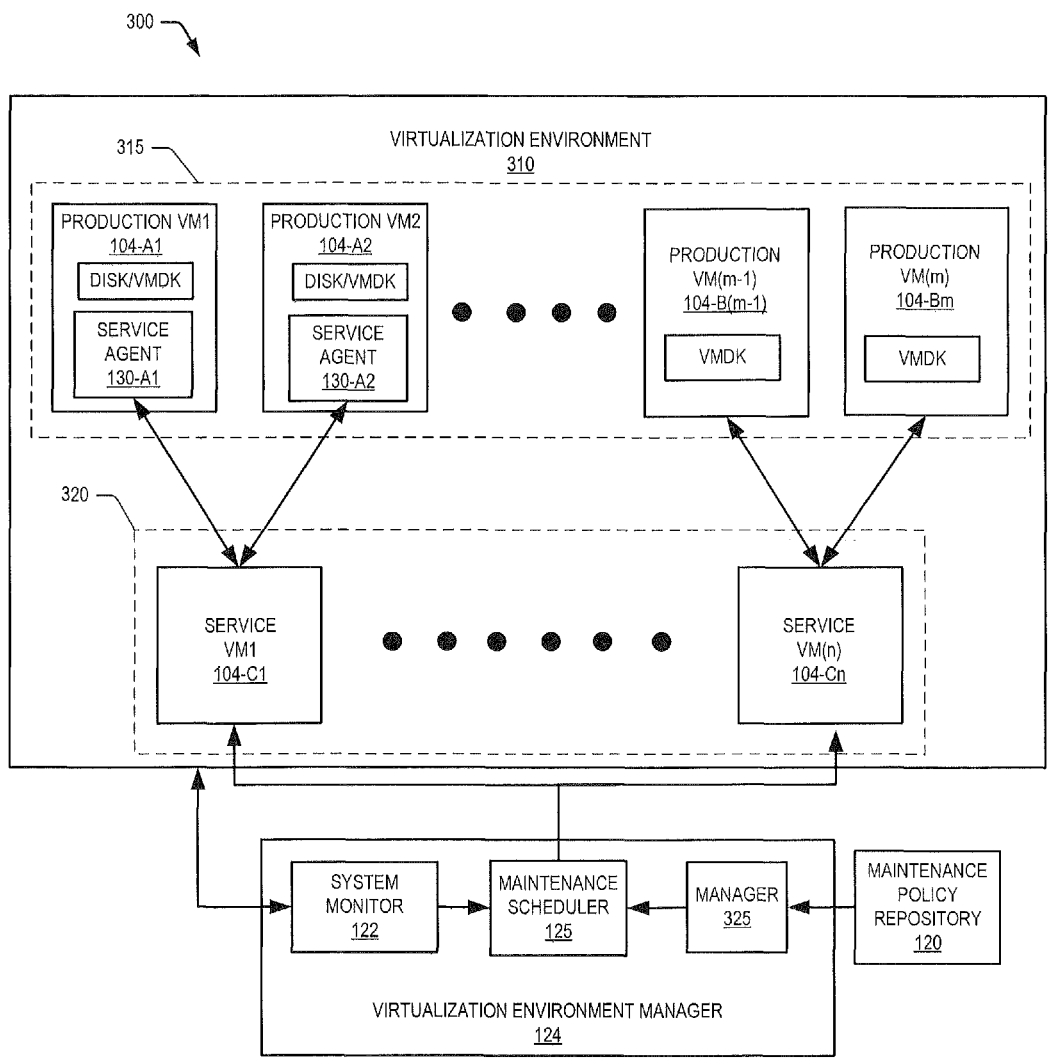
FIG. 3 is a block diagram illustrating a datacenter including production and service virtual machines in accordance with an embodiment of the present disclosure.

While FIG. 2 illustrates a physical configuration of managed machines within a cloud 200, FIG. 3 illustrates a logical grouping of production and service virtual machines 104 deployed within a same environment in a datacenter 300 in accordance with an embodiment of the present disclosure. Virtual machines that are deployed within a same virtualization environment may share physical resources within the datacenter 300. For example, virtual machines that are deployed within a single virtualization environment may share physical memory, storage, communication facilities and other resources or services of a datacenter 300. The virtual machines 104 may also have same or similar resource access privileges (e.g., processor utilization, priority, memory allocation, communication interface access privileges, etc.). Virtual machines 104 within the same virtualization environment can be managed by a single virtualization environment manager, such as the environment manager 124.

As shown in FIG. 3, the datacenter 300 can include one or more virtualization environments, such as the environment 310. The virtualization environment 310 includes a plurality of production virtual machines 104-A1, 104-A2, . . . 104-B(m-1), 104-Bm, and a plurality of service virtual machines 104-C1 . . . 104-Cn. The production machines 104-A1 to 104-Bm define a pool of application servers 315 that are configured to provide computing services. The service virtual machines 104-C1 to 104-Cn define a pool of service machines 320 that are configured to provide maintenance services for the pool of application servers 315. The service machines 104-C1 to 104-Cn are associated with resources having a lower priority than those used by the production machines 104-A1 to 104-Bm in providing the computing services, and thus, may operate with reduced or minimal disruptive effects on the computing services.

In providing the maintenance services, one or more of the service machines 104-C to 104-Cn are configured to mount the virtual machine disks (VMDKs) (or clones thereof) of the respective production machines 104-A1 to 104-Bm, scan the VMDKs or clones to determine maintenance tasks or other corrective actions to be performed, and initiate performance of the determined maintenance tasks/corrective actions. The determined maintenance tasks/corrective actions may be performed by one or more of the service machines 104-C1 to 104-Cn, or by the corresponding one of the production machines 104-A1 to 104-Bm, depending on the state of the production machine and/or the presence of an installed service agent 130.

In particular, when a production machine 104-A1 (having an installed service agent 130-A1) is in an online state, one or more of the service machines 104-C1 to 104-Cn may be configured to mount and scan a clone of the VMDK of the production machine 104-A1, generate a queue of the corrective actions to be performed with regard to the VMDK of the production machine 104-A1, and transmit the queue of the corrective actions to the service agent 130-A1 installed on the production machine 104-A1 for performance thereby. Similar operations may be performed for the production machine 104-A2 when in an online state. Operations for performing corrective actions for a production machine that is in an online state are discussed in greater detail below with reference to the flowchart of FIG. 5.

In addition, when a production machine 104-Bm (which does not have an installed service agent) is in an offline state or in a transient state (e.g., startup or shutdown), one or more of the service machines 104-C1 to 104-Cn may be configured to mount and scan the VMDK of the production machine 104-Bm, and automatically perform the corrective actions for the VMDK to provide a maintained VMDK for mounting on the production machine 104-Bm, as discussed in greater detail below with reference to the flowchart of FIG. 6. Similar operations may be performed for the production machine 104-B(m-1) when in an offline or transient state. Alternatively, the service machines 104-C1 to 104-Cn may mount, scan, and automatically perform corrective actions for the VMDK of the production machine 104-Bm when the production machine 104-Bm is in an online but locked state, as discussed in greater detail below with reference to the flowchart of FIG. 7.

Operations of the production machines 104-A1 to 104-Bm and the service machines 104-C1 to 104-Cn in the virtualization environment 310 are centrally managed by a virtualization environment manager 124. In the embodiment of FIG. 3, the virtualization environment manager 124 includes the system monitor 122, the maintenance scheduler 125, and a manager 325; however, it will be understood that embodiments described herein are not limited to this configuration. The system monitor 122 is configured to monitor the production machines 104-A1 to 104-Bm, the service machines 104-C1 to 104-Cn, the virtualization environment 310, and/or the data center 300 as a whole to determine the availability of resources, respective or collective operating loads, and/or other real time conditions. In response to such real-time conditions, as well as in accordance with one or more maintenance policies stored in a repository 120, the maintenance scheduler 125 is configured to provide instructions or commands to one or more of the service machines 104-C1 to 104-Cn to manage maintenance of the production virtual machines 104-A1 to 104-Bm.

The maintenance policy or policies stored in the repository 120 may indicate a relative priority of one or more of the production machines 104-A1 to 104-Bm with respect to the performance of maintenance items or other corrective actions for the corresponding VMDKs (or physical disks). For example, a policy stored in the repository 120 may indicate that the production machine 104-A1 has a higher priority as compared with production machines 104-A2 to 104-Bm, for instance, based on a service level agreement (SLA), a relative maintenance need, a time of previously performed maintenance, and/or a hardware type associated with the production machine 104-A1. The scheduler 125 may thus schedule maintenance for each the production machines 104-A1 to 104-Bm one-by-one (based on a respective priority) while the others are running, and/or otherwise in a manner that is minimally disruptive to the computing service(s) provided by the production machines 104-A1 to 104-Bm.

As such, the service machines 104-C to 104-Cn may be configured to operate responsive to receiving a command from the maintenance scheduler 125 based on an availability of resources and/or operating loads (of the production machines, the service machines 104-C to 104-Cn, the virtualization environment 310, and/or hardware of the data center 300 as a whole), and/or based on relative priorities among the production machines 104-A1 to 104-Bm as indicated by a stored maintenance policy 120. The maintenance scheduler 125 may also be configured to control operations of one or more of the service machines 104-C to 104-Cn responsive to a state change in one or more of the production machines 104-A1 to 104-Bm. For example, the maintenance scheduler 125 may instruct the service machines 104-C to 104-Cn to initiate performance of particular maintenance operations when a corresponding production machine is online, to initiate performance of other particular maintenance operations when the production machine is offline, and/or to initiate performance of still other maintenance operations when the production machine is in a transient state. Accordingly, the operation of the system monitor 122, the maintenance scheduler 125, and the manager 325 allows for centralized, policy-based management of maintenance operations or other corrective actions for the production machines 104-A1 to 104-Bm on a per-machine basis, a per-environment basis, and/or at the enterprise level (that is, based on operations of all machines in the entire datacenter 300).

Figure 4:
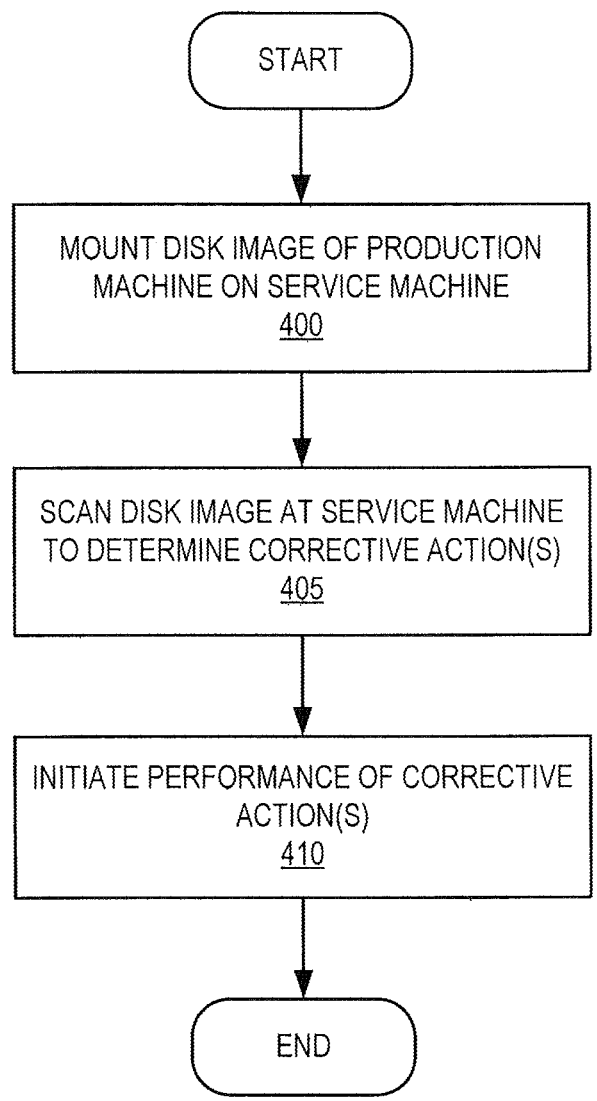
FIGS. 4-7 are flowcharts illustrating operations for providing centralized, policy-driven maintenance of managed machines and related components in accordance with an embodiment of the present disclosure.

FIG. 4 is a flowchart illustrating operations for providing centralized maintenance of managed machines in accordance with an embodiment of the present disclosure. The operations of FIG. 4 may be performed by physical or virtual machines, such as the service managed machines 104-C and/or the maintenance scheduler 125 discussed above with reference to FIGS. 1-3, whether in online, offline, and/or transient states.

Referring now to FIG. 4, a three-phase maintenance process includes mounting a disk image corresponding to a production managed machine on a service managed machine at block 400. The disk image may be a cloned copy of contents stored on a data storage medium associated with the production machine, and may be stored on hardware that is relatively less expensive. For example, the VMDK stored on a SCSI drive associated with a production VM may be cloned (with or without write lock during cloning) to a SATA disk, and the cloned VMDK may be mounted on a service VM. The disk image is scanned by the service managed machine to determine one or more corrective actions to be performed with respect to the disk image at block 405. For example, a service VM may perform a multi-scan of a VMDK from a production VM to determine maintenance tasks to be performed or any other storage issues to be addressed. As the scanning phase may typically consume a relatively large portion (or even a majority) of the datacenter's hardware resources, a service managed machine as described herein can use one or more lower priority computing resources to perform the scan. As discussed herein, lower priority resources may refer to resources that are used less frequently by the production managed machine (or even resources that are not used at all in the production part of the datacenter) in providing the computing service. The service managed machine can thus utilize less expensive and/or less complex hardware (such as no high availability, SATA disks rather than SCSI, slower CPU and memory which are out of service in production but can be used for lower priority tasks, etc.).

Figure 5:
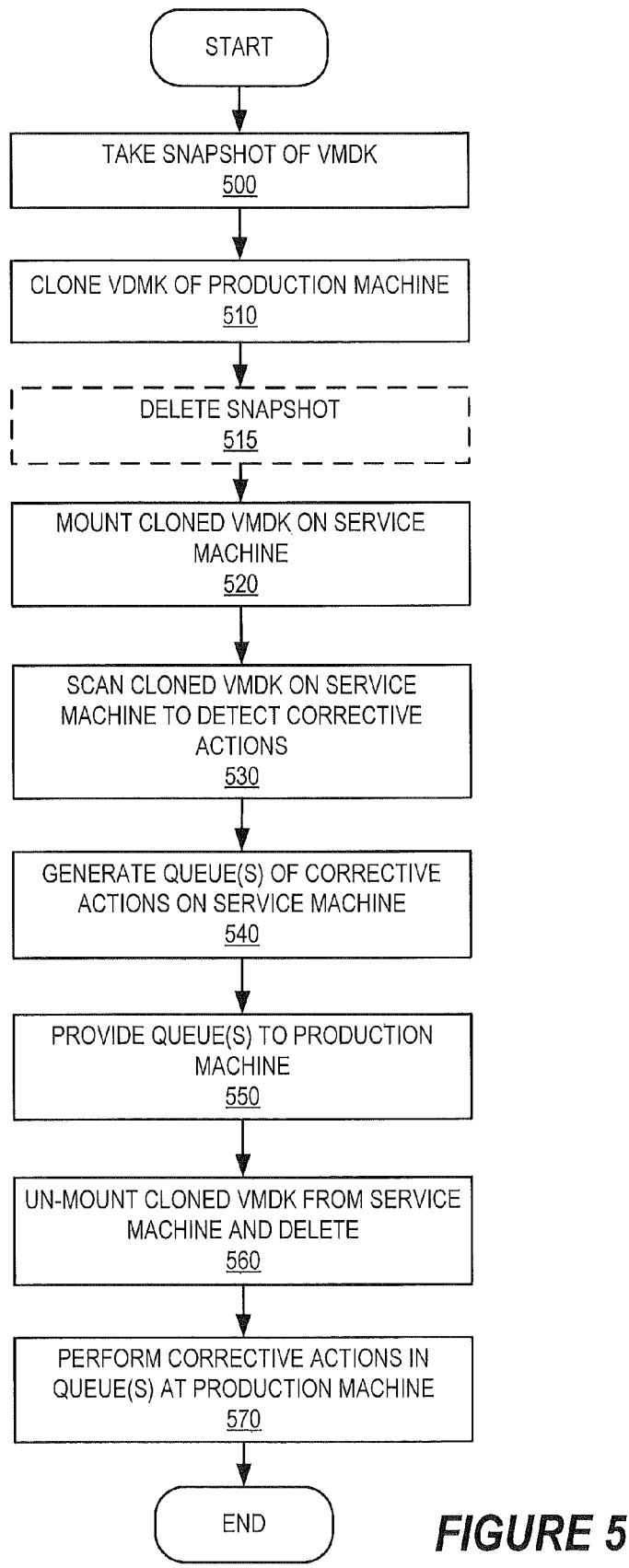

Still referring to FIG. 4, performance of the one or more corrective actions for the disk image of the production managed machine is initiated at block 410 to remedy the issues indicated by the scan, if any are found. The remedying phase or operations may demand fewer hardware resources, as the corrective action(s) may be performed with respect to only a portion of the entire scanned disk image, if at all. The remedying phase may be implemented by a service VM or by the production whose VMDK was scanned, for instance, depending on the operating state of the production VM and/or the presence or absence of an installed service agent on the production VM. For example, when the production VM is offline or in a transient state (i.e., powering-up or powering-down), all maintenance tasks may be executed on the service VM (as the production VM is not active), as described below with reference to the example shown in FIG. 6. Alternatively, when the production VM is online, maintenance tasks may be performed by the production VM itself (for example, when a service agent is installed thereon, as shown in FIG. 5) or by the service VM (when the production VM does not have an installed service agent, as shown in FIG. 7). Thus, disk maintenance tasks may be offloaded and handled over the entire life cycle of the production VMs (that is over the online, offline, and transient states), thereby reducing use of the resources required by the production VM to provide computing services. Accordingly, production managed machines can focus on performance of core tasks relating to the service provided thereby, rather than interrupting performance of such tasks in order to perform disk maintenance.

FIG. 5 is a flowchart illustrating operations for providing centralized maintenance of managed machines in accordance with an embodiment of the present disclosure where a production virtual machine is online and includes an installed service agent. The operations of FIG. 5 may be performed by the service machines 104-C, the production machines 104-A, the service agent 130-A, and/or the scheduler 125 discussed above with reference to FIGS. 1-3. While described in FIG. 5 with reference to virtual machines, the operations of FIG. 5 may be performed with respect to physical machines as well. In some embodiments, the operations of FIG. 5 may be employed in an Information Technology Infrastructure Library (ITIL).

Referring now to FIG. 5, a "snapshot" of a VMDK (or a physical disk) is taken at block 500 to ensure that its state is well-defined. The production VM may (optionally) be locked for writing (e.g., such that the VMDK is read-only). The production VMDK is cloned to a predetermined destination at block 510. For instance, the destination may be a less expensive disk (such as a serial ATA drive), while the production disk may be a SCSI (small computer system interface) drive with redundancy. The snapshot may be deleted at block 515. The cloned VMDK is mounted on a service VM at block 520. The service VM can run on or be otherwise associated with less expensive and/or less complex hardware (such as fewer/slower CPUs or memory, non high availability or fault tolerant configurations, older hardware that is not used in production, etc.). The cloned VMDK is scanned on the service VM at block 530 to determine one or more corrective actions to be performed with respect to the VMDK. A single VMDK clone can be used for multiple maintenance tasks (such as defragmenting, cleaning, detecting and removing malware, configuration management, file integrity monitoring, backup, etc.). At block 540, at least one queue is generated, listing the corrective actions determined from the scan. For example, during the scan, all corrective actions for a particular production VM may be added to one or more queues. The queues may be VM-specific (e.g., all corrective action for a particular production VM are provided in a same queue) or may be task-specific (e.g., separate queues for each maintenance task to be performed for multiple production VMs).

Still referring to FIG. 5, when scanning of the VMDK is complete, the queue(s) of corrective actions are transmitted or otherwise provided to the production VM at block 550. The cloned VMDK is un-mounted from the service VM and deleted at block 560. At block 570, the corrective actions listed in the queue(s) that were prepared by the service VM (if any) are performed at the production VM. In particular, a service agent running on the production VM may receive the queue(s) generated by the service VM and perform the corrective actions listed therein. The service agent may include an event handler for each type of corrective action. For example, the service agent may include an antivirus handler, an operating system (OS) compliance handler, and/or an access control handler to execute antivirus, OS compliance, and/or access control corrective actions that are listed in the queue, respectively. The service agent may only be active when corrective action is requested by the service VM, and may otherwise not consume resources of the production VM.

Accordingly, a VMDK from one or more production VMs is copied to one or more service VMs, scanning of the VMDK(s) is executed by the service VM(s) to determine corrective actions to be performed, and, if corrective actions are determined, the corrective actions are executed back on the production VM(s). These processes are orchestrated by a centralized maintenance scheduler module (also referred to herein as a schedule manager or maintenance scheduler 125). In controlling the operations described herein, the scheduler may consider various factors, such as (but not limited to) the SLA of one or more production VMs, existing maintenance policies of the production VMs (for instance, some VMs may require more thorough maintenance while others may require just one or two tasks), load on the datacenter (for instance to prevent maintenance operations during peak load periods or "rush hours"), load on a specific production VM in the datacenter, load on the service VM(s), hardware type(s) of the production and/or service VMs, time since the last/previously performed maintenance on a production VM, regulatory constraints, and/or operational constraints.

For example, the operations discussed above with reference to FIG. 5 may be employed in maintaining virtual desktops. In particular, the operating system VMDK may be cloned and mounted on a service VM, without locking the VMDK. The service VM may scan the cloned VMDK to determine the presence of fragments, files that can be cleaned, and/or malware, and may prepare a list of corrective actions or tasks to address each of the determined conditions. The service VM may send a queue including the corrective actions to an agent on the production VM, which can perform the corrective actions to remedy the detected conditions.

The operations of FIG. 5 may also be employed in maintaining a production server. In particular, the VMDK of the production server may be cloned and mounted on a service VM, while locking the VMDK for writing. The service VM may scan the cloned VMDK to determine malware, any deviations in the OS configuration, and/or file integrity, and may backup required data from the VMDK. The service VM may send a status of each scan, including any corrective actions to be performed, to the production server. The production server can thus perform the corrective actions indicated in the queue (for example, via an installed service agent) to remedy the determined conditions.

The operations of FIG. 5 may also be used with a pool of application servers, such as the pool 315 of FIG. 3. In particular, the maintenance scheduler may schedule maintenance for each application server while the other application servers are running, and may coordinate performance of the operations of FIG. 5 for a particular application server at its scheduled time. When maintenance has been performed for the particular application server, the maintenance scheduler may move to the next application server to coordinate performance of maintenance operations at its scheduled time, and so on for the entire pool of application servers. Accordingly, only a single server may be at maintenance at any specific time, which may reduce and/or minimize disruptions to the applications or other computing services provided by the pool of application servers while the maintenance operations are performed.

In further embodiments as described below with reference to FIGS. 6 and 7, scanning of the VMDK (or a clone thereof) from a production VM is executed by the service VM(s), and, if corrective actions are required, the corrective actions are executed on the service VM(s). In particular, FIG. 6 is a flowchart illustrating operations for providing centralized maintenance of managed machines in accordance with an embodiment of the present disclosure where a production virtual machine is offline (or in a transition state) and does not include an installed service agent. The operations of FIG. 6 may be performed by the service machines 104-C and/or the scheduler 125 discussed above with reference to FIGS. 1-3.

Figure 6:
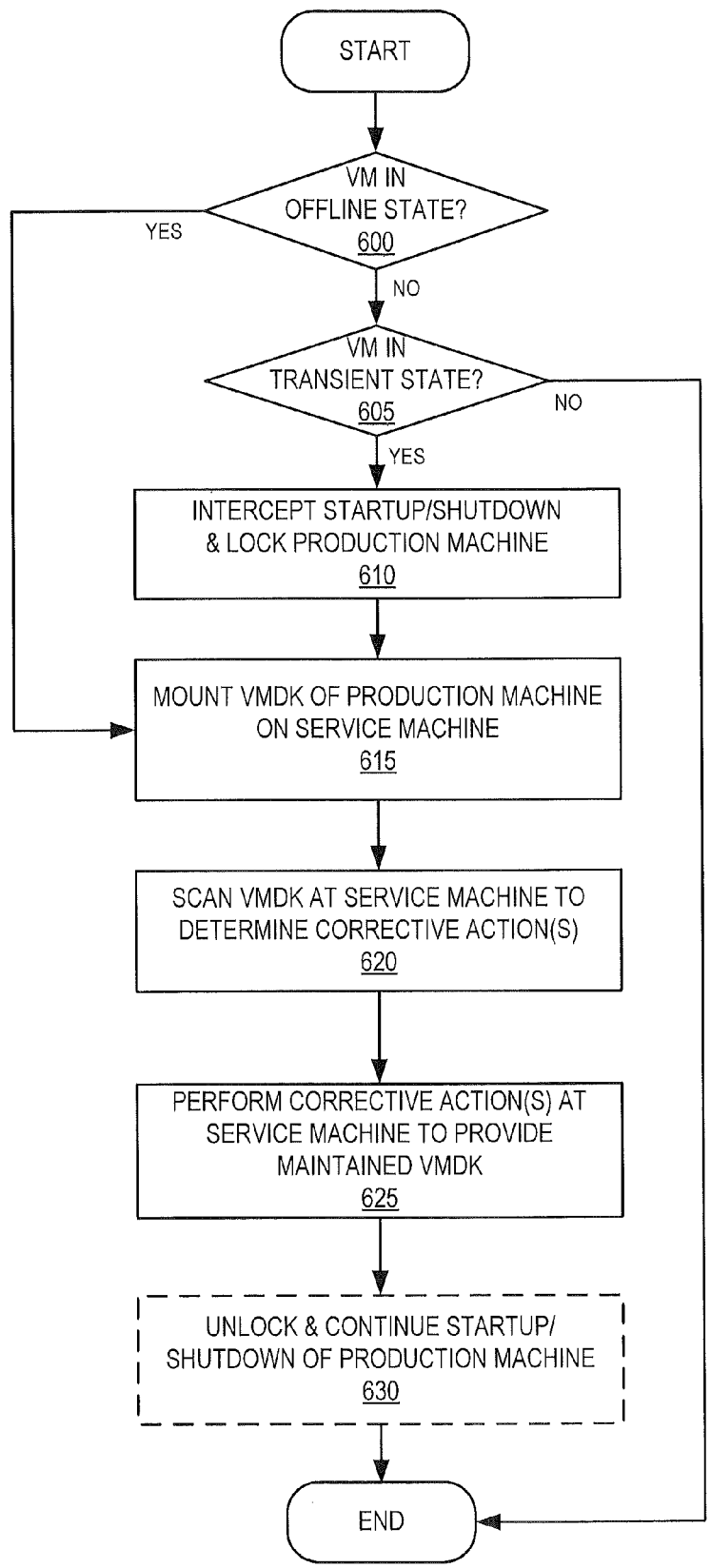
Figure 7:
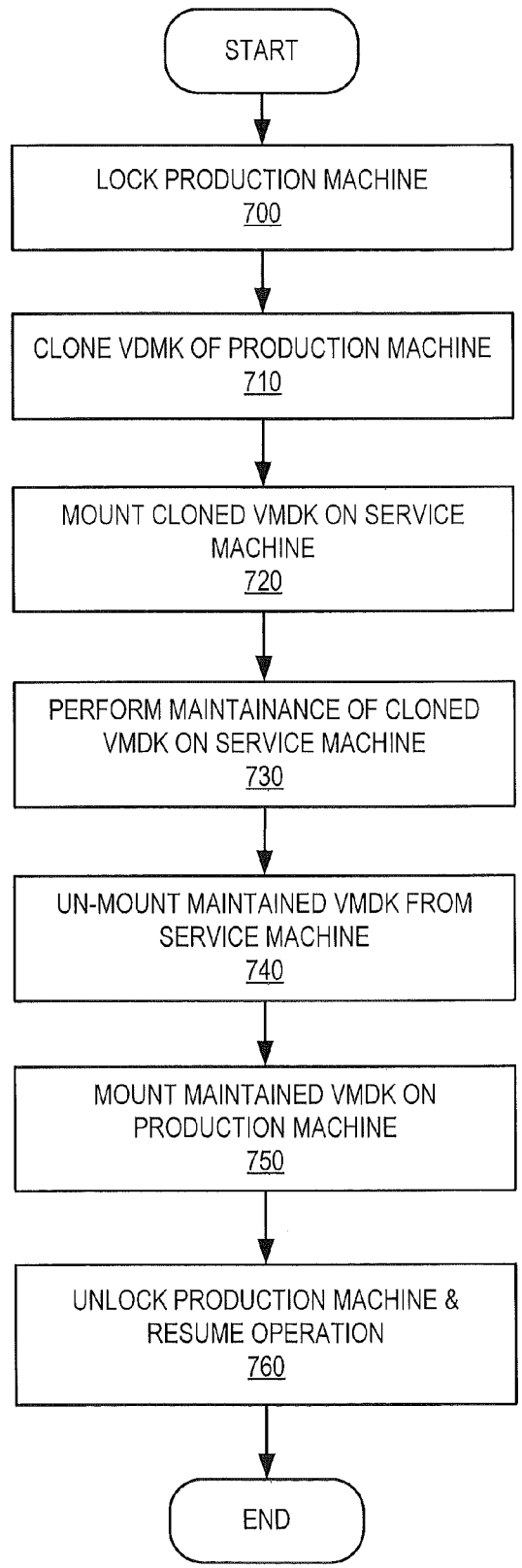

Referring now to FIG. 6, it is determined whether a production VM is offline at block 600 or in a transition state (for example, startup or shutdown) at block 605. If the production VM is in a transient state, the startup or shutdown operations are intercepted and/or interrupted, and the production VM is locked at block 610. With the production VM either offline or locked, the VMDK of the production VM is mounted on a service VM for maintenance at block 615. The service VM scans the VMDK to determine one or more corrective actions or maintenance tasks to be performed with respect to the VMDK at block 620. However, as the production VM is offline or locked (and is thus unavailable to execute the corrective actions), the service VM itself performs the corrective action(s) at block 625 to provide a maintained VMDK. The service VM may run on or may otherwise be associated with less expensive hardware than the production VM (or hardware that is not used by the production VM in providing a computing service), and can thus use lower priority resources for the scanning and/or performance of the corrective action(s) with respect to the VMDK. After the service VM has completed performance of the corrective actions/maintenance tasks, the production VM is unlocked and the power on or power off operation continues (if such operations were interrupted) at block 630. The production VM thereby uses the maintained VMDK when brought back online.

Different maintenance operations may be triggered depending on the state of the production VM. For example, the operations discussed above with reference to FIG. 6 may be employed to defragment, wipe and clean a VMDK while the production VM is migrated from one host to another, or while the production VM is powered off. The maintenance operations can also be triggered in response to other events over the life cycle of the production VM, or when a predetermined amount of time has passed with respect to previous maintenance of the production VM. The operations of FIG. 6 may also be used to format and wipe disks before a production VM is provisioned to a new tenant in multi-tenancy environment.

In some embodiments, the operations of FIG. 6 may be used to maintain a pool of application servers, such as the pool 315 of FIG. 3. In particular, the maintenance scheduler may queue each application server for maintenance by the service VM, and the service VM may perform the maintenance operations for a particular application server at its scheduled time while the other application servers are running. When maintenance has been completed for the particular application server, the application server is brought online (e.g., turned on) again, and uses the maintained disk. The service VM may then perform maintenance operations for the next application server in the queue, and so on for the entire pool of application servers. Accordingly, only a single server may be maintained at any given time, reducing and/or minimizing disruptive effects on the applications or other computing services provided by the pool of application servers.

FIG. 7 is a flowchart illustrating operations for providing centralized maintenance of managed machines in accordance with an embodiment of the present disclosure where a production virtual machine is online and does not include an installed service agent, such as the production machines 104-B discussed above. For example, in some instances, production VMs cannot be turned offline and/or may have no planned shutdown. Accordingly, FIG. 7 provides operations for maintaining the disk of a production VM without using the production VM's hardware resources while the production VM is online. The operations of FIG. 7 may be performed by the service machines 104-C and/or the scheduler 125 discussed above with reference to FIGS. 1-3.

Referring now to FIG. 7, the VMDK of a production VM is locked for writing (e.g., such that the disk is read-only) at block 700. The production VMDK is cloned to a predetermined destination at block 710. For instance, the destination may be a less expensive disk (such as a serial ATA drive), while the production disk may be a SCSI (small computer system interface) drive with redundancy. The cloned VMDK is mounted on a service VM at block 720. The service VM can run on or otherwise utilize less expensive hardware relative to that associated with the production VM.

Still referring to FIG. 7, the cloned VMDK is maintained on the service VM at block 730, resulting in a maintained VMDK. For example, the service VM may scan the VMDK to determine one or more corrective actions to be performed with respect to the VMDK, and the service VM may itself perform the corrective action(s) using the cloned VMDK. The service VM may use lower priority resources for the scanning and/or performance of the corrective action(s), such that performance and/or operations of the production VM are relatively unaffected. A single VMDK clone can be used for multiple maintenance tasks (such as defragmenting, cleaning, detecting and removing malware, configuration management, file integrity monitoring, backup, etc.). The maintained VMDK is unmounted from the service VM at block 740, and the maintained VMDK is mounted on the production VM to replace the unmaintained VMDK at block 750. Once the maintained VMDK is mounted on the production VM, the VMDK is unlocked and the production VM can resume operations at block 760.

Accordingly, embodiments of the present disclosure may provide several advantages. For example, the present disclosure allows for improved quality of storage and performance, due to continuous VMDK maintenance. The present disclosure further allows for improved efficiency of production systems, by moving or offloading many or even most of the maintenance tasks from production VMs to service VMs, thereby freeing the resources of the production VMs that would otherwise be used for maintenance tasks. The present disclosure also allows for unification, as disk maintenance is executed centrally rather than on each VM separately, regardless of hardware, operating system, or virtualization environment.

Embodiments of the present disclosure also allow for datacenter improvement or optimization. In particular, rather than locally optimizing each VM without considering the effects on other VMs in the datacenter, the present disclosure provides coordinated, holistic datacenter optimization, as most and/or all maintenance tasks can be offloaded to hardware that is less expensive than the higher cost hardware used to implement the production VMs. In addition, embodiments described herein allow for load balancing, as the maintenance tasks can be scheduled and executed when the datacenter is not fully loaded and can be stopped at peak times, for example, responsive to receiving instructions from the scheduler. Maintenance tasks can also be executed on less expensive hardware that is infrequently or otherwise not used by the production VMs. Embodiments of the disclosure further allow for policy driven maintenance, providing options such as prioritization according to SLA, as well as for a reduction in required storage size, due to continuously cleaning data from disks.

Accordingly, embodiments of the present disclosure can ensure that VMDK maintenance is executed in a centralized, managed, and efficient manner, in contrast to sporadic, ad hoc approaches. Some embodiments described herein further reduce installation issues and agent footprint in the datacenter, as well as consider business-centric information technology (IT) management concerns, which may be linked to improvement or optimization of the virtual environment.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method of operating a computing system, the method comprising:
   mounting a disk image corresponding to a production managed machine on a service managed machine in response to a command from a maintenance scheduler, wherein the production managed machine performs operations to provide a computing service for a user, and wherein the service managed machine performs maintenance operations distinct from the operations performed by the production managed machine in providing the computing service;
   scanning the disk image at the service managed machine to determine a corrective action to be performed with respect to the disk image, wherein the corrective action comprises one of the maintenance operations; and
   initiating performance of the corrective action for the disk image of the production managed machine at the service managed machine, wherein initiating performance comprises:
      when the production managed machine is in an online state, transmitting data specifying the corrective action that was determined at the service managed machine to a service agent installed on the production managed machine for performance thereby; and
      when the production managed machine is not in the online state, performing the corrective action for the disk image at the service managed machine to provide a maintained disk image for subsequent use by the production managed machine.

2. The method of claim 1, wherein the service managed machine is associated with a hardware resource having a lower priority with respect to providing the computing service relative to a hardware resource used by the production managed machine in providing the computing service.

3. The method of claim 1, wherein, when the production managed machine is in the online state, the disk image comprises a cloned copy of contents stored on a data storage medium associated with the production managed machine.

4. The method of claim 3, wherein the corrective action comprises a plurality of corrective actions to be performed, and wherein initiating performance when the production managed machine is in the online state comprises: generating a queue of the plurality of corrective actions at the service managed machine; and
   transmitting data specifying the queue of the plurality of corrective actions to the service agent for performance thereby.

5. The method of claim 1, wherein the production and service managed machines comprise virtual machines.

6. The method of claim 1, further comprising:
   receiving the command from the maintenance scheduler based on an availability of resources in the computing system.

7. The method of claim 6, wherein the production managed machine comprises one of a plurality of production managed machines, and wherein the maintenance scheduler provides the command to the service managed machine based on a relative priority of the production managed machine among the plurality of production managed machines as indicated by a stored maintenance policy.

8. The method of claim 7, wherein the relative priority is based on one selected from a service level agreement, a relative maintenance need, a time of previously performed maintenance, and a hardware type associated with the production machine.

9. The method of claim 6, further comprising:
   receiving the command from the maintenance scheduler responsive to a state change in the production managed machine.

10. The method of claim 1, wherein the disk image is stored on hardware that is not configured for use by the production managed machine in providing the computing service.

11. A computer system comprising:
   a production managed machine to perform operations to provide a computing service; and
   a service managed machine to perform maintenance operations distinct from the operations performed by the production managed machine in providing the computing service, wherein the service managed machine is to mount a disk image corresponding to the production managed machine responsive to a command from a maintenance scheduler, scan the disk image to determine a corrective action to be performed with respect to the disk image, wherein the corrective action comprises one of the maintenance operations, and initiate performance of the corrective action for the disk image of the production managed machine,
   wherein, when the production managed machine is in an online state, the service managed machine is to transmit data specifying the corrective action to a service agent installed on the production managed machine for performance thereby, and
   wherein, when the production managed machine is not in the online state, the service managed machine is to perform the corrective action for the disk image to provide a maintained disk image for subsequent use by the production managed machine.

12. The system of claim 11, wherein the service managed machine is associated with a hardware resource having a lower priority with respect to providing the computing service relative to a hardware resource used by the production managed machine in providing the computing service.

13. The system of claim 11, wherein, when the production managed machine is in the online state, the disk image comprises a cloned copy of contents stored on a data storage medium associated with the production managed machine.

14. The system of claim 13, wherein the corrective action comprises a plurality of corrective actions to be performed, and wherein, when the production managed machine is in the online state, the service managed machine is to generate a queue of the plurality of corrective actions based on relative priorities thereof as specified by a stored policy and transmit data specifying the queue of the plurality of corrective actions to the service agent for performance thereby.

15. The system of claim 11, wherein the production and service managed machines comprise virtual machines.

16. The system of claim 11, wherein the service managed machine is to mount the disk image responsive to receiving the command from the maintenance scheduler based on an availability of resources of the computing system.

17. The system of claim 16, wherein the production managed machine comprises one of a plurality of production managed machines, and wherein the maintenance scheduler is to provide the command to the service managed machine based on a relative priority of the production managed machine among the plurality of production managed machines as indicated by a stored maintenance policy.

18. The system of claim 17, wherein the relative priority is based on one selected from a service level agreement, a relative maintenance need, a time of previously performed maintenance, and a hardware type associated with the production machine.

19. The system of claim 16, wherein the maintenance scheduler provides the command to the service managed machine responsive to a state change in the production managed machine.

20. The system of claim 11, wherein the disk image is stored on hardware that is not configured for use by the production managed machine in providing the computing service.

21. A server system, comprising:
a processor;
a host operating system that executes on the processor;
a plurality of virtual machines deployed within a virtualization environment and that execute on the processor, wherein the virtual machines comprise a production virtual machine to perform operations to provide a computing service and a service virtual machine to perform maintenance operations distinct from the operations performed by the production virtual machine in providing the computing service; and
a virtual hypervisor to provide an interface between the host operating system and the virtual machines,
wherein the service virtual machine is to mount a virtual machine disk image corresponding to the production virtual machine responsive to a command from a maintenance scheduler, scan the virtual machine disk image to determine a corrective action to be performed with respect to the virtual machine disk image, wherein the corrective action comprises one of the maintenance operations, and initiate performance of the corrective action for the virtual machine disk image of the production virtual machine,
wherein, when the production virtual machine is in an online state, the service virtual machine is to provide data specifying the corrective action to a service agent installed on the production virtual machine for performance thereby, and
wherein, when the production virtual machine is not in the online state, the service virtual machine is to perform the corrective action for the virtual machine disk image to provide a maintained disk image for subsequent use by the production virtual machine.

22. The system of claim 21, wherein the service virtual machine is associated with a hardware resource having a lower priority with respect to providing the computing service than a hardware resource used by the production virtual machine in providing the computing service.

23. The system of claim 21, wherein, when the production virtual machine is in the online state, the disk image comprises a cloned copy of contents stored on data storage medium associated with the production virtual machine.

24. The system of claim 23, wherein the corrective action comprises a plurality of corrective actions to be performed, and wherein, when the production virtual machine is in the online state, the service virtual machine is to generate a queue of the plurality of corrective actions and provide data specifying the queue of the plurality of corrective actions to the service agent for performance thereby.

25. The system of claim 20,
wherein the maintenance scheduler is to provide the command to the service virtual machine to mount the virtual machine disk image based on an availability of resources in the computing system.

26. The system of claim 25, wherein the production virtual machine comprises one of a plurality of production virtual machines, and wherein the maintenance scheduler is to provide the command to the service virtual machine based on a relative priority of the production virtual machine among the plurality of production virtual machines as indicated by a stored maintenance policy.

27. A computer program product for operating a computing system comprising a production virtual machine that performs operations to provide a computing service and a service virtual machine that performs maintenance operations distinct from the operations performed by the production virtual machine in providing the computing service, the computer program product comprising:
a non-transitory computer readable storage medium having computer readable program code embodied in the medium, the computer readable program code comprising:
computer readable program code to mount a virtual machine disk image corresponding to the production virtual machine on the service virtual machine responsive to a command from a maintenance scheduler;
computer readable program code to scan the virtual machine disk image at the service virtual machine to determine a corrective action to be performed with respect to the virtual machine disk image, wherein the corrective action comprises one of the maintenance operations; and
computer readable program code to initiate performance of the corrective action for the virtual machine disk image of the production virtual machine, wherein the computer readable program code to initiate performance comprises:
computer readable program code to transmit, when the production virtual machine is in an online state, data specifying the corrective action that was determined at the service virtual machine to a service agent installed on the production virtual machine for performance thereby; and
computer readable program code to perform, when the production virtual machine is not in the online state, the corrective action for the disk image at the service virtual machine to provide a maintained disk image for subsequent use by the production virtual machine.

* * * * *